Feb. 22, 1955   B. D. VIRMANI   2,702,691
GENERATOR SYSTEM FOR PRODUCING ROTATING VIBRATORY FIELD
Filed May 6, 1949   5 Sheets-Sheet 1
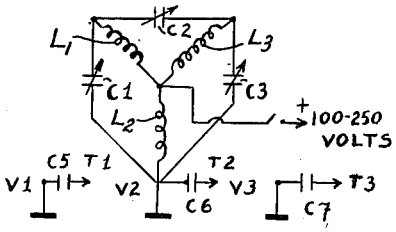
*Fig.1*
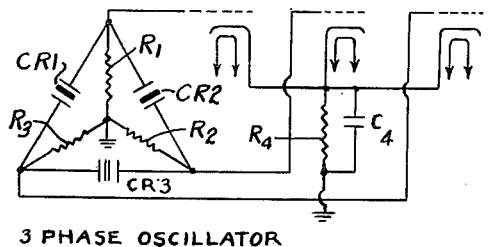
3 PHASE OSCILLATOR
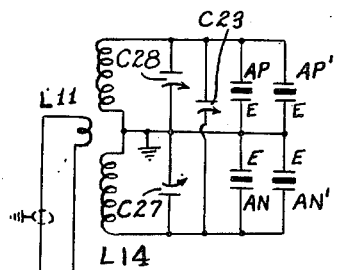
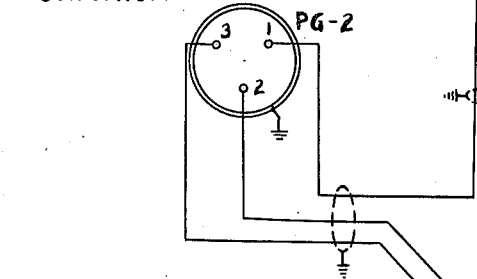
*Fig.2*
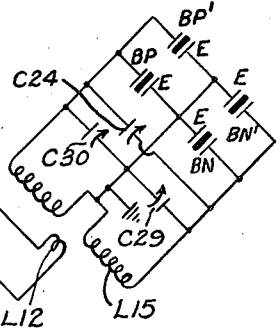
*Fig.3*
INVENTOR.
BRYANT DAVID VIRMANI
BY
ATTORNEY Feb. 22, 1955   B. D. VIRMANI   2,702,691
GENERATOR SYSTEM FOR PRODUCING ROTATING VIBRATORY FIELD
Filed May 6, 1949   5 Sheets-Sheet 2
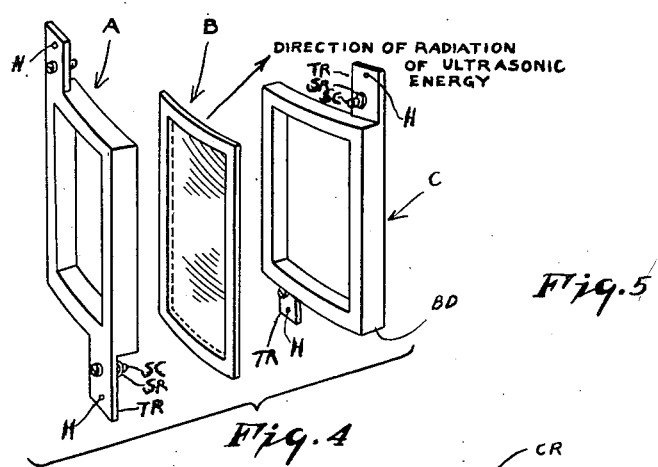
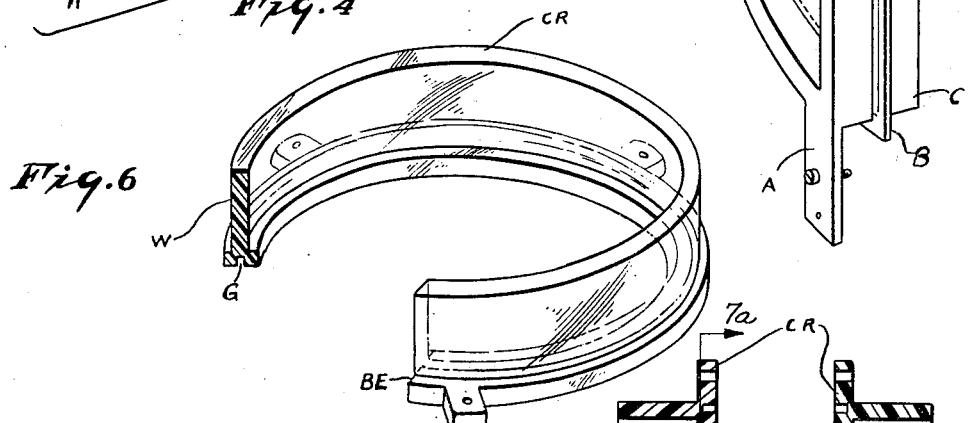
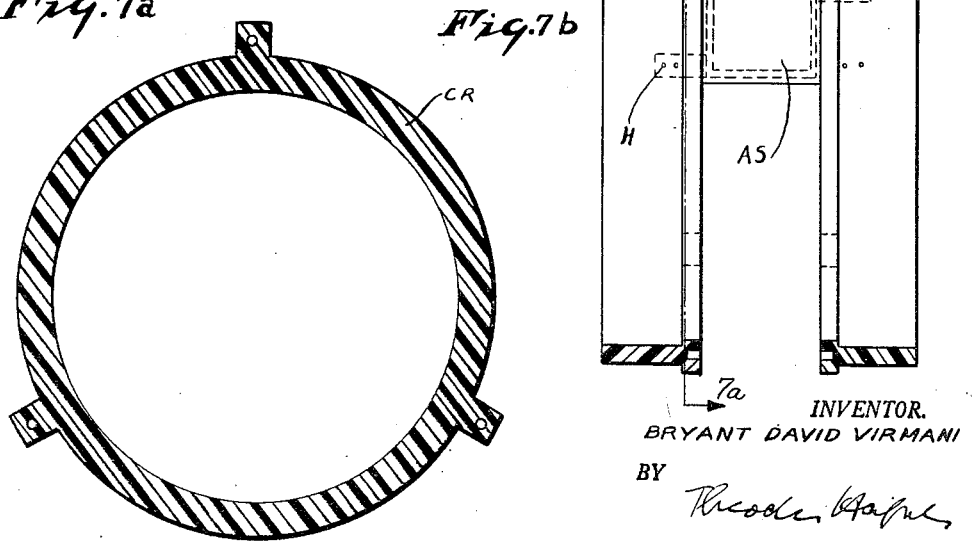
INVENTOR.
BRYANT DAVID VIRMANI
BY
ATTORNEY

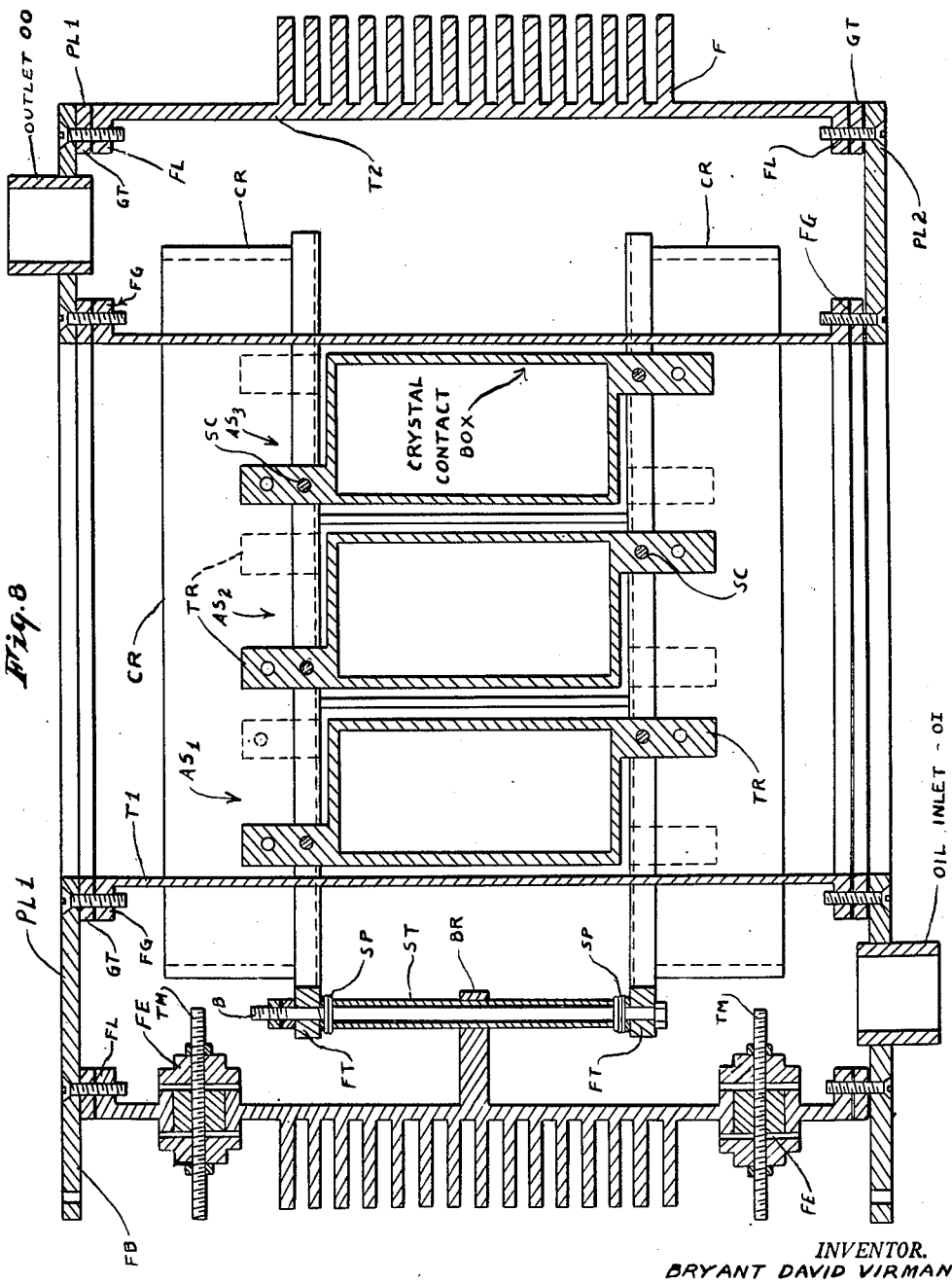

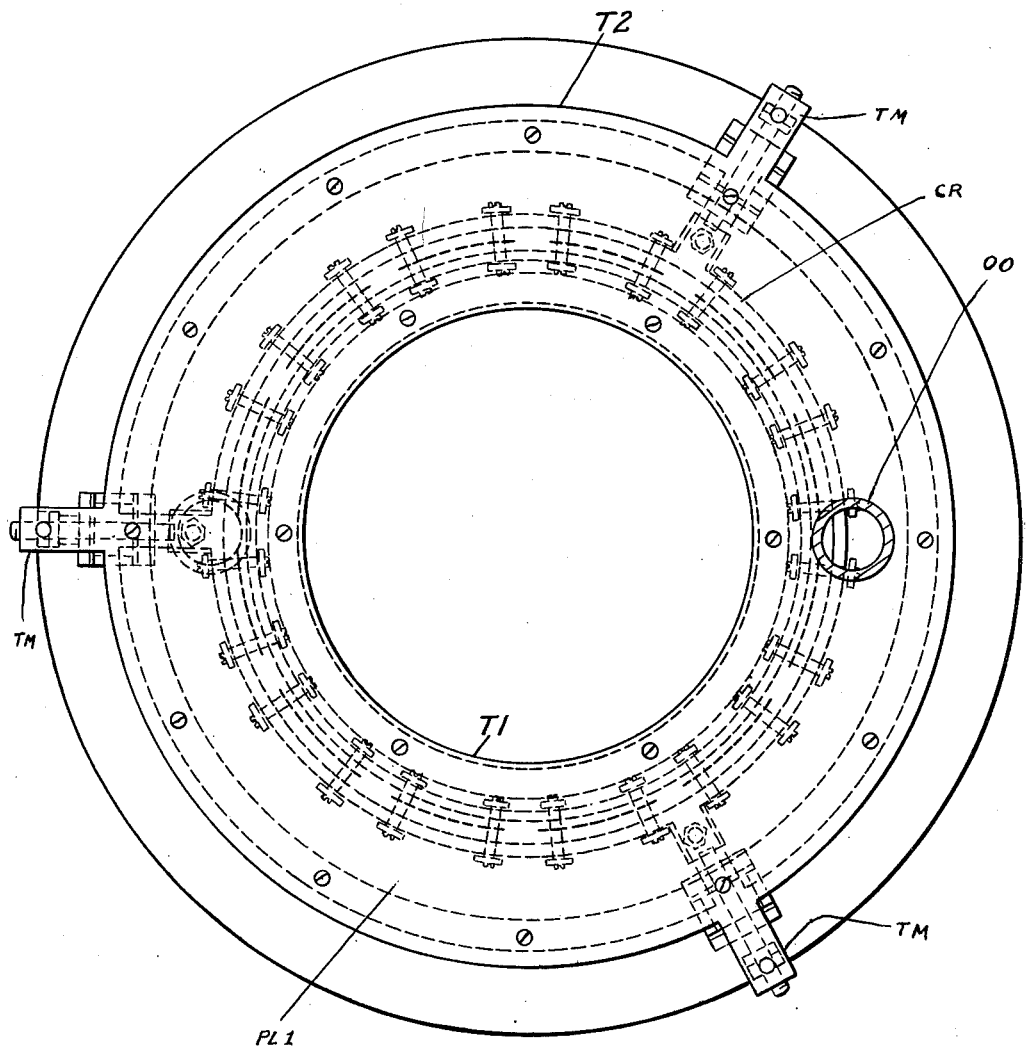

Feb. 22, 1955 B. D. VIRMANI 2,702,691
GENERATOR SYSTEM FOR PRODUCING ROTATING VIBRATORY FIELD
Filed May 6, 1949 5 Sheets-Sheet 5

INVENTOR.
BRYANT DAVID VIRMANI
BY
ATTORNEY

# 2,702,691

GENERATOR SYSTEM FOR PRODUCING ROTATING VIBRATORY FIELD

Bryant David Virmani, Buenos Aires, Argentina, assignor of one-tenth to The James Knights Company, Sandwich, Ill., a corporation of Illinois, and nine-tenths to Polyducer Corporation Application May 6, 1949, Serial No. 91,797

6 Claims. (Cl. 259—1)

The present invention relates to a system for generating compressional vibrations covering the spectrum of subsonic, sonic, supersonic, ultrasonic and hypersonic frequencies and more specifically to the production of a rotating field of such vibrations.

The invention comprises, as an example, a generator of polyphase electric oscillations, which is employed to drive means for converting the said oscillations into corresponding sound vibrations. The latter "means" shall hereinafter be called a "Polyducer" wherever the context so requires or admits.

For the sake of convenience and also by way of example, the number of phases in the term "polyphase" used in the specification will be taken as three, although it will be apparent as the discussion proceeds that the invention is not so limited.

The invention will be described, by way of example, with reference to the drawings accompanying the present specification, in which:

Fig. 1 represents the circuit diagram of a generator of three-phase electric oscillations adapted to operate a Polyducer and to cover the entire range of subsonic, sonic, supersonic, ultrasonic and hypersonic frequencies.

Fig. 2 illustrates the manner in which twelve quartz crystals forming a Polyducer may be connected in a polyphase electrical circuit in accordance with my invention.

Fig. 3 shows the twelve crystals of Fig. 2 positioned physically along the circumference of a circle in order to generate a rotating field at the center of the circle.

Fig. 4 at "A," "B" and "C" is an exploded view showing the position of a quartz plate relative to the inner and outer contact boxes.

Fig. 5 illustrates a manner in which a quartz crystal is actually used.

Fig. 6 illustrates in perspective supporting means for crystals of a Polyducer.

Fig. 7A is a transverse sectional view taken along lines 7a—7a of Fig. 7b showing the manner in which the said quartz crystals are fastened, and Fig. 7B a corresponding side view in section.

Figs. 8 and 9 are cross sectional and top views respectively of a completely assembled Polyducer.

Figure 10:
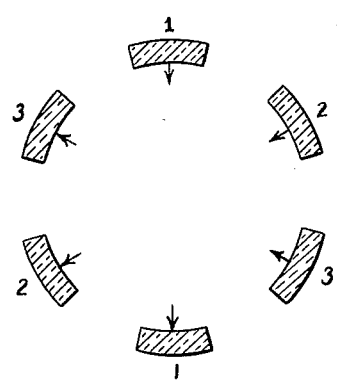
Figure 11:
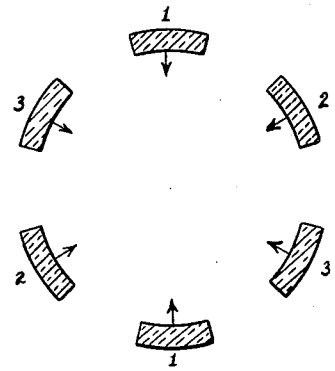

Figs. 10 and 11 show the possible arrangements and polarities of an array of six crystals which may be employed in accordance with the present invention.

Figure 12:
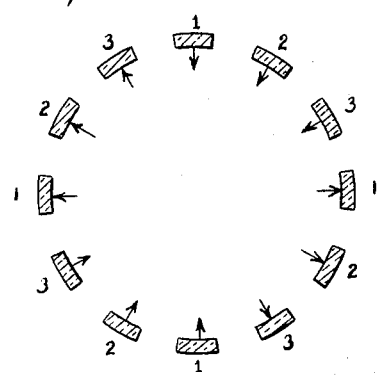
Figure 13:
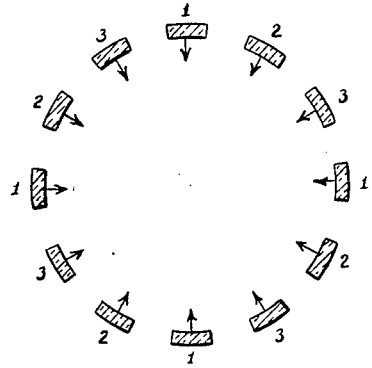

Figs. 12 and 13 represent arrays of twelve crystals arranged to operate in opposition (12) and in unison (13) respectively.

It is an object of the present invention to provide means for generating compressional waves for treating fluid and solid substances to bring about physical and chemical changes therein. More particularly, it is an object to produce an apparatus for generating waves of high intensity and high frequency capable of producing orbital movement of the particles in the substance being acted upon. In one of its aspects it is an object of the invention to provide improved means for generating polyphase high frequency current. In still another aspect it is an object to provide an improved piezo-electric transducer arranged for excitation from a polyphase power source.

Other objects and advantages will become apparent upon reading the following specification and with reference to the attached drawings. Attention will first be given to the means for generating the polyphase exciting current.

By way of example, Fig. 1 illustrates a circuit of a 3-phase generator constructed in accordance with the present invention in which the frequency of electric oscillations is controlled by three identically cut quartz crystals, CR1, CR2, CR3, connected in a triangular network. In each of the phases the associated tubes V1, V2 and V3 oscillate when the plate circuit is tuned to resonate with the grid circuit. In the circuit of Fig. 1, the three phases of oscillations are generated in their proper phase relationship of 120 degrees between each phase by means of two triangular networks, one in the grid circuit including said crystals, and the other in the plate circuit, which comprises the inductors L1, L2, L3 and capacitors C1, C2, C3. The oscillation will be generated by the tubes V1, V2 and V3 when the plate circuit is resonated with the grid circuit. If desired to cover a wide range of frequencies, the crystals CR1, CR2, CR3, may be replaced by three inductors connected in a manner identical to that of the crystals. The junctions of the said inductors may be connected to a three gang variable condenser whose moving vanes are grounded. The output of each phase may either be taken at the terminals T1, T2, T3 through the capacitors C5, C6, C7 respectively.

Fig. 2 illustrates the use of twelve quartz crystals in the Polyducer, by way of example. Terminals T1, T2, T3 fit into terminals 1, 2, 3 of plug PG–1 and transfer the power of the 3-phase generator of Fig. 1 through the link coupling the coils L10, L11, L12 to the center tapped coils L13, L14 and L15 respectively, which have their electrical center points grounded. Each of the latter coils is tuned to resonance by the respective combination of capacitors, C22, C25, C26 and C23, C27, C28 and C24, C29, C30 respectively, transferring the load of the 3-phase generator of Fig. 1 to the crystals, AN, AP, AN', AP', BN, BP, BN', BP', CN, CP, CN', CP' connected in their respective circuits as shown in Fig. 2. All these crystals are identically ground to oscillate at the same frequency, which is the frequency of the 3-phase generator. When they receive energy from the generator, they vibrate mechanically and thus generate sound, the intensity of which varies with the applied power and thickness of the crystal.

Fig. 3 illustrates a mechanical layout of the twelve crystals shown connected in the electrical circuit of Fig. 2. The mechanical positions are similar to the poles of a polyphase electric motor. All the electrodes marked "E," which are at ground potential, are placed externally around the circumference of the circle, while all the live electrodes are placed internally. Electrodes with the suffixes P and N or P' and N' are excited 180 degrees out of phase similar to poles of a 3-phase electric motor.

Fig. 4 at "B" illustrates, by way of example, a form of quartz plate cut in the direction of the electrical axis. It is curved and plated on both sides with a thin film of metal of high electrical conductivity, such as silver or gold.

Fig. 4 at "A" and "C" illustrates suitable forms of inner and outer contact boxes, which make electrical contact with the metalized surfaces of the quartz plates, mentioned above, and permit sound vibrations generated by the crystal to pass freely.

Fig. 5 illustrates a manner in which a quartz crystal B is actually used, sandwiched between contact boxes A and C.

Fig. 6 illustrates in perspective one of the two clamping rings made of insulating plastic such as Lucite (Reg. T. M.) and employed in the Polyducer for holding the quartz crystals rigidly in a circular relation.

Fig. 7A and B show the manner in which the quartz crystals assembled with their corresponding contact boxes are held as indicated for example by assembly AS between two clamping rings of the type shown in Fig. 6.

In Figs. 8 and 9, the twelve crystal assemblies AS of which only AS1, AS2, AS3 are shown clamped between the two clamping rings, are held vertically within the annular space defined by internal and external tubes T1 and T2 respectively. The top and bottom openings of the annular space are closed by means of two annular rings PL–1 and PL–2 respectively and the space is filled with oil which may be kept in circulation by an external pump connected between oil inlet O1 and oil outlet O0. The oil serves the triple purpose of (a) acting as a refrigerant, (b) as an electrical insulator and (c) as a conductor of sound vibrations. The external tube T-2 is provided with cooling fins, F, as an additional means of dissipating rapidly the heat generated by the crystals in action. The Polyducer has a central work cavity within the tube T-1, through whose wall the sound vibrations pass. A substance whether in a solid liquid or gaseous state, requiring treatment by the sound vibrations, is placed within the cavity.

Figs. 10 through 13 illustrate diagrammatically a number of possible crystal arrangements which may be employed in practicing the present invention. In the case of each crystal the number indicates the phase to which the crystal is connected and the arrow represents the sense in which the crylstal vibrates under the influence applied voltage. For example, in the first of the four arrangements shown the crystals indicated "1" move in unison in the same direction while in the second arrangement they move in opposition to one another.

Figs. 10 and 11 represent arrays of six crystals arranged to vibrate in opposition (Fig. 10) and in unison (Fig. 11) respectively.

Figs. 12 and 13 represent arrays of twelve crystals arranged to vibrate in opposition (Fig. 12) and in unison (Fig. 13) respectively.

Due to the nature of the applied 3-phase electric oscillations, the field of the sound vibrations generated by the crystals inside the circle is rotary, the rate of rotation being given by the formula:

$$\text{Revolutions per second} = \frac{\text{Frequency} \times \text{No. of phase}}{\text{No. of pairs of poles}}$$

Therefore in a Polyducer two different kinds of motions take place simultaneously: one is the mechanical vibration of the crystals corresponding to their natural frequency and the other is due to the rotation of the field of sound vibrations the rate of which may be determined according to the above formula. The rate of rotation may be controlled and this factor offers several advantages. For example, it may be used to produce effects obtained by the use of a centrifuge. Practical examples of the cases will be cited later in which the rotary field as well as the resonant frequency of the crystals used in the Polyducer may be utilized to advantage.

While the above analogy to an A. C. motor assists one in understanding the operation of the device, it will be understood by one skilled in the art that the interactions of the crystals may be somewhat more complex than this. One of the difficulties in making a thorough analysis is the fact that the diametrical distance between the crystals may, in the practical case, be several times the wave length of the compressional wave being generated by the crystals. It is quite likely, therefore, that the phase relationships between the individual wave trains set up by the crystals will vary from point to point within the region enclosed by the crystals.

My studies indicate clearly that the particle movement which results is orbital. But be that as it may, the Polyducer disclosed herein including its associated electrical circuit serves as an extremely efficient modifier of various substances placed within the work space enclosed by the crystals. Attention may next be directed more specifically to the means here employed for mounting the crystals about the work space.

Figs. 8 and 9 illustrate, by way of example, a practical form of the construction of a complete Polyducer. The twelve crystals mentioned above are cut curved in the form shown at "B" in Fig. 4. Both surfaces of the crystal are plated with thin films of metal of high electrical conductivity, such as silver or gold. The films serve the purpose of providing a good electrical contact with the surfaces of the crystals without impeding the crystals from vibrating mechanically in the direction of the thickness as indicated by the arrow. All crystals used in the Polyducer are identical and they have been left unplated around their margins. Each crystal is sandwiched between two hollow inner and outer boxes of metal as shown at "C" and "A" respectively of Fig. 4 in the manner illustrated in Fig. 5. The inner and outer boxes are held in electrical contact with the crystal's metallized surfaces. The boxes are made a little bit smaller than the crystal, so that its unplated edges protrude out of the boxes. The top and bottom edges fit into the small central grooves "G" cut into the underside surfaces of two similar rings, one of which is shown in Fig. 6. The said rings may be of any suitable insulating material for high frequencies. All of the crystals are held vertically between the grooves of the two rings, which are then clamped together by means of three long tie-bolts "B" (Fig. 8). Each one of the said bolts is inserted first through a hole drilled through each one of the feet "FT" of the lower ring (Figs. 6, 7A, 7B, and 8), thereafter over it are passed a spring washer SP and a spacer tube ST. Thereafter the bolt is passed through a hole in the retaining bracket "BR" (Figs. 8 and 9) at the other end of which are passed over it again another spacer tube, then another spring washer, and thereafter the top ring. On the other side of the top ring a nut "N" is tightened, its tension adjusted and thereafter locked into position by a second nut LN. Three equally spaced retaining brackets "BR" (Figs. 8 and 9) are located centrally inside the outer cover tube of metal T2. The brackets may either be manufactured separately and thereafter screwed into the wall of the tube T2 or they may be cast as integral parts of the tube T2.

After the crystals have been clamped into position between the two clamping rings (one of which is shown in Fig. 6) in the manner described above, they are then sandwiched between a pair of contact boxes (Figs. 4 and 5). The breadth "BD" (Fig. 4B) of each contact box is a little larger than half the breadth "BE" (Fig. 6) of the clamping rings. Also the thickness of the wall "W" of the clamping rings is made conveniently less than the breadth "BE" of the lower part of the ring. Thus the separation between the outer and inner edges of the wall with respect to the outer and inner edges of the lower part of the ring are made equal. Therefore when a crystal is sandwiched between a pair of contact boxes, ample space is left between the wall "W" (Fig. 6) and the terminal "TR" (Fig. 4). Each terminal TR carries a screw SC, which is screwed into the wall "W" of the upper and lower clamping rings as shown in Figs. 7B and 8. The space left between the wall "W" and the terminal TR is occupied by a spiral spring, which is passed over each screw SC. The contact boxes are thus held in position between the two clamping rings and their pressures of contacts with the metallized surfaces of the crystal is thus made adjustable on account of which the crystal is able to vibrate at full amplitude freely. Each terminal TR has also an extra hole "H" drilled in it for the purpose of screwing soldering tags for making electrical connections. All the outer boxes are connected together to the body of the outer tube T2 (Fig. 8), which is then connected to earth. This part of the electrical circuit is well illustrated in Fig. 3. The inner contact boxes are electrically intergrouped according to the circuit of Fig. 2 and the six electrical points so obtained are connected to the six terminals TM respectively of the feed-thru insulators "FE" (Figs. 8 and 9). These terminals are then joined electrically to their respective inductors and capacitors, as shown in the circuit of Fig. 2, which are fixed externally to the Polyducer in a suitable manner.

The distance between the inner surface of the wall of the outer tube T2 (Figs. 8 and 9), and the piezo-electric crystals has been so adjusted to cause a maximum reflection of the sound vibrations generated by the said crystals during the reverse half-cycle of the applied sine wave cycle generated by the radio frequency generator which excites the said crystals. The said distance may be a function of a band or bands of frequencies to which the said crystals used in the Polyducer may be cut or their harmonic or harmonics thereof.

The outer tube T2 (Figs. 8 and 9) is provided with cooling fins "F" in order to radiate heat developed by the crystals during operation. The said tube is provided with internal flanges "FL" at either end. A second metal tube T1, which has external flanges "FG" at either end, is inserted in the cavity of the clamping rings "CR". The annular space is inserted in the cavity of the clamping rings "CR". The annular space thus formed is closed at either end by means of the annular metal plates PL-1 and PL-2, which are fastened to the flanges of the inner and outer tubes by means of screws. Fibre gaskets GT are inserted between the said flanges and the said annular plates in order to make the joints oil tight. Two further small tubes T3 and T4 are screwed centrally into the plates PL-1 and PL-2 respectively. Since during the operation of the Polyducer considerable heat is developed by the crystals, the annular space between the tubes T1 and T2 is filled with high grade transformer oil. The oil is constantly kept in circulation by an external pump.

In order to make cooling highly efficient it enters through the inlet tube T3, flows against gravity (upwards) and leaves through the outlet tube T4. Besides serving as a refrigerant the oil acts as a conductor of sound vibrations and also as an electrical insulator as the crystals work at very high voltages in the Polyducer.

The plates PL–1 and PL–2 have each been provided with fixing brackets FB (Figs 8 and 9) with a hole in each of them for the purpose of fastening the Polyducer to an external support.

Having now described the invention, practical examples will be cited in which the rotary field as well as the natural frequency of the crystals' vibrations used in the Polyducer may be utilized. The examples are given as follows:

(1) It is a known fact that high intensity supersonic waves cause smoke and dust particles to agglomerate suggesting applications in the smoke prevention field. The removal of the agglomerated particles, in the case of the mono-phase supersonic systems, is effected by another machine, called a "Cyclone", which makes use of the rotating currents of air to blow the soot out. The efficiency of the removal of the agglomerated particles depends upon the efficiency of the Cyclone, which is comparatively low.

The solid particles suspended in a fluid have a natural frequency of vibration and therefore the desired effect or effects can be produced on them by having the crystals of the Polyducer to vibrate at the resonant frequency of the particles. Because the Polyducer also generates a rotating field with a controllable rate of rotation, the need for a cyclone is eliminated and thus the efficiency of the removal of the particles comparatively raised.

(2) In a bottle of milk, when placed in the cavity of the Polyducer, the bacteria can be killed instantaneously and simultaneously the fat may either be dissolved, making the milk more easily digestible, or the fat may be removed, depending upon the rate of rotation of the field. Thus the need for separate churning machines is eliminated and the same effects may be produced with comparatively much higher efficiency by the rotating field of the Polyducer.

(3) Wines and liquors may be aged permanently and more rapidly than by the use of mono-phase ultrasonic systems. According to the present invention the ageing is done by making the molecules of the wines and liquors to vibrate at their natural frequency by means of the sound vibrations generated by the crystals cut to correspond to the molecular frequency and the churning effect produced in the wines and liquors by the rotating field of the polyducer. In the same manner the sediments in the liquids may either be dissolved or the suspended particles may be separated depending both upon the frequency of vibrations of the crystals and the rate of rotation of the "sonic" field of the Polyducer.

(4) If a specimen of blood containing live bacteria is placed in the field of the Polyducer, the bacteria can be disintegrated instantaneously by regulating the frequency of the crystals and simultaneously the red blood corpuscles can be separated from the serum and settled down at the bottom of the container of blood by the rotary field of the Polyducer.

The present polyphase system of sound generation enables the present field of use of monophase systems to be considerably widened. Heretofore, in the case of a monophase transducer, which can make use of no more than a single quartz crystal, heavily loaded, the maximum power that the said crystal can handle safely has been limited to 500 watts only. This limitation does not exist in the present invention of the Polyducer, because it employs several pairs of crystals, loaded to the extent of a kilowatt of power per pair. The intensity of the sound generated by the Polyducer is, therefore, many times greater than that of a monophase transducer. Therefore at higher levels of intensity it becomes possible to produce certain effects, which have been considered impracticable or impossible, at the level of 500 watts of power.

Furthermore, the power that a single crystals of quartz can handle depends upon the thickness of the X-cut plates. The cut has been found by the art to be most suitable for applications requiring the conversion of electric vibrations into the mechanical vibrations in the crystal. Because the resonance frequency of the crystal is an inverse function of its thickness and as the power handling capacity too is an inverse function of the thickness, therefore in case of the monophase systems, known to the art, the upper boundary of frequency is restricted in applications which simultaneously need high power as well. Because a Polyducer employs several pairs of crystals and if they are very thin, the total power that can be pumped into the "work" requiring treatment, at higher frequencies can be much greater than in case of monophase transducers. Therefore according to the present invention of the polyphase system of sound gencration the upper limit of frequency is raised. Therefore it becomes possible to produce effects by means of the Polyducer previously considered either impossible or extremely difficult to produce.

The following example illustrates the usefulness of the applications of high power at the raised limit of frequencies combined with the effect of the rotating field: Heretofore it has been known that an egg of a bird, such as a hen, remains unaffected when placed in the field of ultrasonic waves of high intensity. The explanation of this is that the monophase systems have not been able to reach the higher boundary of frequency combined with the relatively higher power lever for penetration of the shell. Moreover the monophase system, already known to the art, creates monodirectional agitation which affects the egg-shell non-uniformly, and therefore the part, or parts, which receive comparatively less energy, transfer their resistance to the part or parts under greater influence. On the other hand, when an egg is placed in the field of a Polyducer, it receives equal energy from all sides and therefore it yields to the influence. Higher frequency vibrations at a comparatively higher power level penetrate through the shell of the egg, cause the atoms of the liquid contents inside the shell to vibrate and the rotary field causes a churning effect at ultrahigh velocities. The result of all this is that the growth of the egg stops instantaneously and the egg remains permanently in the state in which it existed at the time of treatment. The shell of the egg prevents bacteria from entering the egg and therefore after treatment in a polyducer the storage problems involved in keeping the egg fresh are eliminated and at the same time the churning effect due to the rotary field of the polyducer vastly improves the taste of the egg and makes it more easily digestible.

In case of monophase systems employing quartz crystals transducers, the size of the transducer has been extremely restricted, because, due to the size of the raw crystal quartz which exists in nature, the maximum available size of an X-cut crystal is approximately 4 to 6 inches. Therefore the working area being severely limited, the monophase transducer is not able to deal with a large volume of "work." On the other hand, because a polyducer makes use of several pairs of crystals circumferentially displaced with respect to one another, the diameter of the "work" can be measured in feet and even yards.

The recent discovery of the piezo-electric effect in barium titanate ceramics reduces the size and vastly improves the scope of use of the Polyducer. The piezo-electric barium titanate ceramic, being a synthetic material, can be manufactured in slabs of large size, which when employed in a polyducer, can increase its size tremendously, thus enabling the hardening of materials in a volume not considered possible heretofore.

Although one embodiment of the invention has been described in detail, it is understood that the invention is not limited to this embodiment, and any modifications can be made within the scope of the invention, as defined in the appended claims.

I claim:

1. Wave generating apparatus for treatment of a material by compressional vibration, the combination comprising an assembly of piezo-electric crystal plates arranged substantially edge to edge but spaced from each other in a substantially cylindrical formation to define a closed material treating space, each crystal being arranged to vibrate substantially independently and separately from the others and said crystals being arranged with their principal axes in such a manner as to direct their vibrations into said closed material treating space, a polyphase oscillator for generating polyphase alternating current at a frequency which is sufficiently high to bring about the desired change in said material, said oscillator having output lines for carrying the polyphase current, coupling means including resonant circuits connected to each of said lines, said plates being connected in groups to said resonant circuits in such manner that at least some of successive plates of said assembly differ from one another incrementally in phase so that a high intensity rotating field of vibration is set up within said material treating space.

2. Apparatus according to claim 1 comprising holder means for clamping each of said crystals, said holder means including inner electrodes arranged to engage an edge portion of the respective crystal thereby permitting free vibration of the central portion of the crystal.

3. Apparatus according to claim 1 comprising holder means including a box-shaped inner electrode arranged to engage the edge portion of the associated crystal thereby permitting free vibration of the central portion thereof.

4. Apparatus according to claim 1 wherein each of said crystals has a holder comprising a pair of box-like electrodes dimensioned to contact the edge portion of the plate for clamping crystals between them while leaving the central portion thereof free to set up vibrations in said material treating space in the direction of said material treating space, and clamping members for engaging the upper and lower edges of the holders respectively.

5. Apparatus according to claim 1 wherein each of said crystals has a holder comprising a pair of box-like electrodes dimensioned to contact the edge portion of the plate for clamping the crystals between them while leaving the central portion thereof free to set up vibrations in said material treating space in the direction of said material treating space, and upper and lower clamping rings for engaging the upper and lower edges of the holders respectively, said clamping rings having an annular groove therein for receiving the adjacent edges of the crystals.

6. Apparatus according to claim 1 comprising holder means for said crystals, said holder means being so constructed and arranged that the plates are gripped at the edges while leaving the center portions thereof free to vibrate in the direction of said material treating space, a housing for said crystal assembly, said housing comprising an outer cylinder and inner cylinder telescoped together to define an annular space therebetween for insertion of the crystal assembly, said inner cylinder serving to define said material treating space and means for circulating oil within said housing to cool and insulate the crystal assembly as well as conduct the compressional vibrations to said material treating space.

References Cited in the file of this patent

UNITED STATES PATENTS

| | | |
|---|---|---|
| 1,584,490 | Taylor | May 11, 1926 |
| 1,654,196 | Taylor | Dec. 27, 1927 |
| 1,829,234 | Nicolson | Oct. 27, 1931 |
| 1,975,517 | Nicolson | Oct. 2, 1934 |
| 2,163,649 | Weaver | June 27, 1939 |
| 2,416,314 | Harrison | Feb. 25, 1947 |
| 2,439,499 | Williams et al. | Apr. 13, 1948 |
| 2,480,385 | Sebring | Aug. 30, 1949 |
| 2,565,159 | Williams | Aug. 21, 1951 |
| 2,578,505 | Carlin | Dec. 11, 1951 |